United States Patent [19]

Kurei

[11] 4,349,261
[45] Sep. 14, 1982

[54] ELECTROMAGNETIC RELEASE DEVICE FOR SINGLE LENS REFLEX CAMERA

[75] Inventor: Hiroshi Kurei, Kasagoe, Japan

[73] Assignee: Asahi Kogaku Kogyo Kabushiki Kaisha, Tokyo, Japan

[21] Appl. No.: 227,561

[22] Filed: Jan. 22, 1981

[51] Int. Cl.³ .......................... G03B 9/08; G03B 19/12
[52] U.S. Cl. ..................................... 354/152; 354/234
[58] Field of Search ............... 354/136, 152, 234, 235, 354/242–244, 266–269, 43, 271, 204–206; 335/219

[56] References Cited

U.S. PATENT DOCUMENTS 3,882,523  5/1975  Uno et al. ..................... 354/152 X
4,127,326  11/1978  Matsumoto ....................... 354/234
4,179,201  12/1979  Kurei et al. ..................... 354/43 X Primary Examiner—L. T. Hix
Assistant Examiner—William B. Perkey
Attorney, Agent, or Firm—Sughrue, Mion, Zinn, Macpeak & Seas

[57] ABSTRACT

An electromagnetic release device for a single lens reflex camera in which the force urging a release lever into abutment with a locking lever is released upon completion of a photographing operation. A rotatably mounted release lever is coupled through a pin to a coupling lever and armature which is adapted to be attracted and held by an electromagnet assembly. A release spring is looped around the shaft upon which the release lever is mounted and has a forwardly-extending end which abuts a portion of a rotatably mounted charge lever when the charge lever is in its position at the completion of a winding operation. Upon application of an electrical pulse to the coil of the electromagnet assembly, the armature is released and the release lever kicks a locking lever. Upon completion of a photographing operation, the charge lever is restored and contact between the charge lever and release spring removed to thereby eliminate the force produced by the release spring which urges the armature away from the electromagnet assembly.

7 Claims, 6 Drawing Figures

ELECTROMAGNETIC RELEASE DEVICE FOR SINGLE LENS REFLEX CAMERA

BACKGROUND OF THE INVENTION

The present invention relates to an electromagnetic release device for a single lens reflex camera.

Shaking a camera while the shutter is being released greatly reduces the sharpness of a picture if an ordinary mechanical shutter is employed. In order to eliminate this problem, an electromagnetic release system has been employed to release the shutter of a camera. With the electromagnetic release system, a switch is operated to release the shutter and therefore the release stroke is short. In addition, the power required for operating the switch is very small. Thus, the electromagnetic release system is suitable for overcoming the adverse effects of shaking a camera while taking a picture.

In general, a magnet employed in an electromagnetic release device utilizes an excitation system including a permanent magnet. However, presently known electromagnetic systems involve problems relating to how to effectively provide a load which is required for the shutter release operation, how to provide a recharge after the shutter release operation has been completed, and how to eliminate overcharge after the shutter release operation.

Accordingly, an object of the invention is to provide an electromagnetic release device of simple construction in which the above-described problems have been solved.

SUMMARY OF THE INVENTION

In accordance with this and other objects of the invention, there is provided an electromagnetic release device for a single lens reflex camera including an armature and an electromagnet assembly composed of a permanent magnet, a yoke which is magnetically coupled to the permanent magnet and a coil wound on the yoke. The armature is adapted to be attracted and retained by the electromagnet when no current is flowing in the coil. A release lever is coupled to the armature, preferably through a coupling lever. The release lever confronts at one end a locking lever which is adapted to stop upward movement of the mirror of the camera and to lock the mirror. A charge lever is rotatably mounted at a position such that a force of energization to move the armature apart from the yoke of the electromagnet assembly is provided by the charge lever pressing against a release spring which is elastically coupled to the release lever when the charge lever is in its charged position to which it is set at the completion of a winding operation. The armature is released by applying an electrical pulse to the coil of the electromagnet assembly whereupon the release lever abuts and kicks the locking lever. The charge lever is restored by running of a bottom curtain of the camera which is effected when a photographing operation is completed whereupon the force of the release spring is eliminated.

DESCRIPTION OF THE PREFERRED EMBODIMENTS

Preferred embodiments of the invention will be described with reference to the accompanying drawings.

Figure 1:
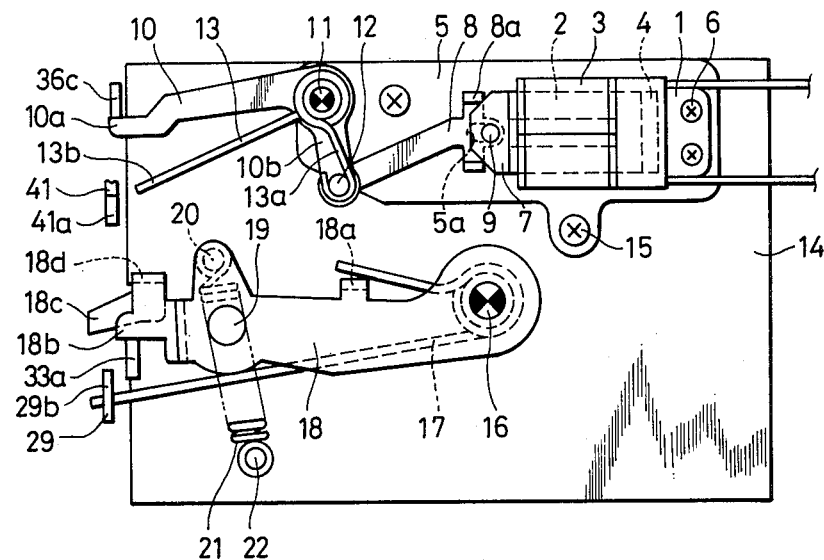
FIG. 1 is a plan view of an electromagnetic release mechanism and the lower part of a mirror operating mechanism of the invention showing the mechanism in a state thereof prior to a winding operation.

FIG. 1 is a plan view of an electromagnetic release mechanism and a mirror operating mechanism constructed in accordance with the invention showing a state of these mechanisms prior to a film winding operation. As shown in FIG. 1, an electromagnet 1 has a U-shaped yoke 2 and a coil 3 wound on the yoke 2 and is provided with a permanent magnet 4 secured to the yoke 2. The electromagnet 1 is fixedly secured to a base plate 5 with screws 6. The armature 7 of the electromagnet 4, which is adapted to be attracted and retained by the magnetic force of the electromagnet 4, is pivotally coupled to a coupling lever 8 by a pin 9. An upwardly bent portion 8a of the coupling lever 8 is disposed with a small clearance between itself and the side of the armature 7 which is opposite to the attracting surface of the armature 7. The lower end portion of the pin 9 rides in an elongated guide hole 5a cut in the base plate 5. A release lever 10 is pivotally mounted on a shaft 11. One end portion 10a of the release lever 10 extends to the left and abuts against the lower end 36c of a second locking lever 36 (described below) while the opposite end 10b is pivotally coupled to the left end portion of the coupling lever 8 by a pin 12. One end portion 13a of a spring 13, which has a center portion looped around the pin 11, is hooked around the pin 12 while the other end portion 13b extends to the left. The base plate 5 of the electromagnetic release device thus constructed is fixedly secured to a mirror box 14 with screws 15.

A mirror operating spring 17 and a charge lever 18 are pivotally mounted on a shaft 16 which is fixedly secured to the mirror box 14. One end portion of the mirror operating spring 17 is engaged with the outside of a downwardly bent portion 18a of the charge lever 18 and the other end portion is inserted into a hole 29b cut in one end portion of a mirror operating lever 29 (described below). An upwardly extending charge pin 19 and a downwardly extending spring hook member 20 are fixedly provided on the charge lever 18. The charge pin 19 is arranged so as to abut against a winding charge lever (not shown). One end portion of a restoring spring 20 is connected to the hook member 20 and the other end portion is connected to a pin 22 which is fixedly secured to the mirror box 14. The charge lever 18 has engaging portions 18b and 18c at the left end thereof. The engaging portion 18b is engaged with one end portion 33a of an intermediate lever 33 (described below). The engaging portion 18c is arranged to be locked by a locking hook portion 14a of a first locking lever 41 (FIG. 5) so as to maintain the charge lever 18 charged when a winding operation has been completed.

Figure 5:
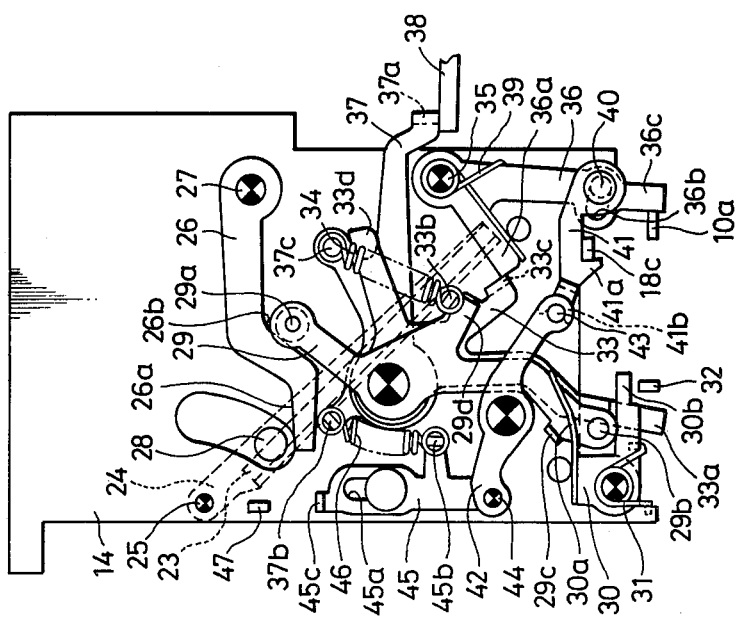
FIG. 5 is a plan view of a mirror operating side mechanism showing it in a state in which the mirror has been moved down and the winding operation has been accomplished.

FIG. 5 is a plan view of a mirror operating side mechanism showing a state thereof in which the mirror has been lowered so that the viewfinder is operative and in which a winding operation has been completed. A mirror holder 24 holding the mirror 23 is pivotally mounted on a shaft 25 which is secured to the mirror box 14. The mirror holder 24 is held at a viewfinder observing position with a mirror lowering spring (not shown). A mirror lifting lever 26 which is pivotally mounted on a shaft 27 secured to the mirror box 14 is provided with cams 26a and 26b. The cam 26a abuts against a pin 28 secured to the mirror holder 24 and the cam 26b is engaged with a roller 29a which is rotatably mounted on one end portion of a mirror operating lever 29. A circular hole 29b is formed in the lower end portion of the mirror operating lever 29 and, as described above, one end portion of the mirror operating spring 17 is inserted into the circular hole 29b. A shutter start lever 30 is pivotally mounted on the mirror box 14 and is urged to turn counterclockwise by a spring 31. One end portion 30a of the shutter start lever 30 is so designed that when the mirror is lifted, the end portion 30a is engaged with the upwardly bent portion 29c of the mirror operating lever 29 while the other end portion 30b abuts against a shutter locking lever 32.

The mirror operating lever 29 and an intermediate lever 33 are pivotally mounted on the same shaft. The lower end portion 33a of the intermediate lever 33 is engaged with the locking portion 18b of the above-described charge lever 18. The intermediate lever 33 has an upwardly bent portion 33b, a downwardly bent portion 33c and an extended portion 33d. The upwardly bent portion 33b abuts against an extended end portion 29d of the mirror operating lever 29. The downwardly bent portion 33c abuts against the locking part 36a of a second locking lever 36 which is pivotally mounted on the mirror box 14 by a shaft 35. The extended end portion 36d abuts against a pin 37c secured to a swing lever 37. The swing lever 37 has a bent portion 37a at the right end thereof. The bent portion 37a is engaged with a lens aperture lever 38.

One end of a coupling spring 34 is coupled to the upwardly bent portion 33b of the intermediate lever 33 and the other end to the pin 37a so that the intermediate lever 33 is elastically coupled to the swing lever 37. The second locking lever 36 is urged to turn clockwise by a spring 39 but its operating range is limited by an elongated hole 36b cut in the lower end portion of the second locking lever 36 and a shaft 40.

A first locking lever 41, which is pivotally mounted on the mirror box by a shaft 40, has a locking hook portion 41a and a forked portion 41b. When a winding operation has been accomplished, the locking hook portion 41a locks the locking portion 18c of the charge lever 18 to maintain the charge lever 18 charged. The forked portion 41b is fitted on a pin 43 which is secured to a coupling lever 42. One end portion of the coupling lever 42 is coupled to a releasing lever 45 by a pin 44. The operating range of the releasing lever 45 is limited by an operation guide hole 45a which is an elongated hole. The releasing lever 45 has an upwardly bent portion 45b and a bent portion 45c. One end of a spring 46 is coupled to the upwardly bent portion 45b and the other end to the upwardly bent portion 37b of the swing lever. The bent portion 45c is so positioned that it abuts against a shutter bottom curtain lever 47 when the latter has run to achieve an exposure operation.

Figure 4:
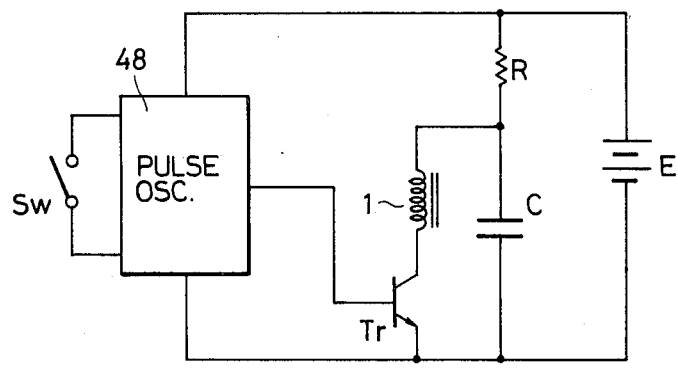
FIG. 4 is a circuit diagram showing an electromagnetic release drive circuit of the invention.
Figure 6:
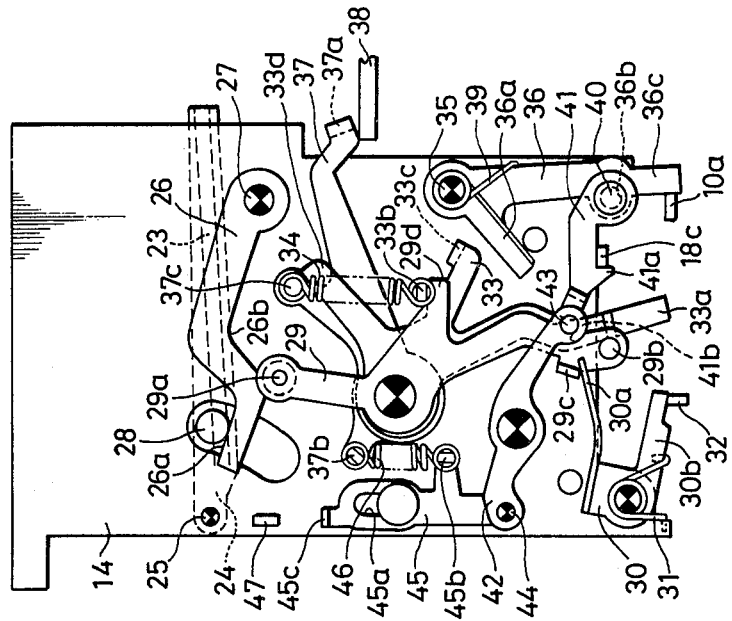
FIG. 6 is a plan view of the mirror operating side mechanism of FIG. 5 showing it in a state in which the mirror has been moved up.

FIG. 4 shows an electromagnetic release drive circuit used with the invention. A series RC circuit composed of a resistor R and a capacitor C is connected across a power source E. The junction point of the resistor R and the capacitor C is connected through the coil of an electromagnet 1 to the collector of an NPN transistor Tr, the emitter of which is connected to the negative terminal of the source E. The base of the transistor Tr is connected to a pulse oscillator 48 to which a switch SW is connected. The resistance of the coil of the electromagnet is much smaller than that of the resistor R.

FIG. 1 shows the electromagnetic release device in its state prior to a winding operation. The winding operation causes a winding charge lever (not shown) to move the charge pin 19 upwardly in FIG. 1. The charge lever 18 is thus turned clockwise against the force of the restoring spring 21. In this operation, as the mirror operating spring 17 is charged, the mirror operating lever 29 engaged with the end of the spring 17 moves upwardly in FIG. 1. Further, as the operating lever 29 turns counterclockwise, the intermediate lever 33 is caused to turn counterclockwise by the extending end portion 29d. However, the counterclockwise movement of the operating lever is stopped by the second locking lever 36. Accordingly, the mirror operating spring 17 is also charged by the clockwise movement of the charge lever 18.

Figure 2:
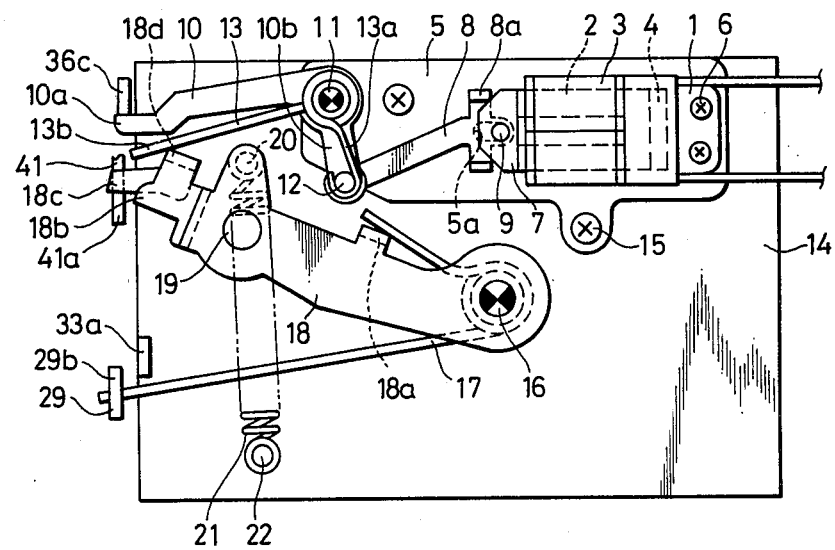
FIG. 2 is also a plan view showing the mechanism of FIG. 1 in a state after the winding operation has been completed.

FIG. 2 shows the electromagnetic release device in a state after the winding operation has been completed. When the charge lever 18 has achieved its charging operation, the left end locking portion 18c of the charge lever 18 is engaged with the locking hook portion 41a of the first locking lever 41. In this operation, the bent portion 18d of the charge lever 18 is abutted against the end portion 13b of the release spring 13 to charge the latter, thereby to urge the release lever 10 clockwise. However, the release lever 10 is maintained at the same position as that before the winding operation because the armature 7 is attracted and retained by the magnetic force of the electromagnet 1.

Figure 3:
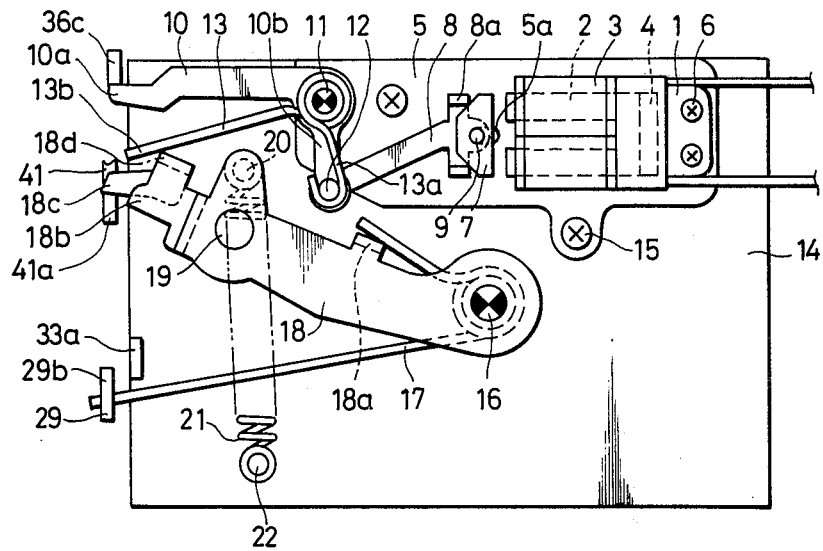
FIG. 3 is a plan view showing the mechanism of FIG. 1 in a state in which an armature is moved apart from an electromagnet by an electromagnetic release circuit.

Referring back to FIG. 4, when the switch SW is closed in response to the shutter release operation, the pulse generator 48 outputs a pulse to render the transistor Tr conductive for a period of time sufficient to discharge the capacitor C. Since the internal resistance of the coil of the electromagnet 1 is much smaller than that of the resistor R, the capacitor C, which was charged by the power source E, is discharged through the coil of the electromagnet 1 substantially instantaneously to thereby develop a magnetic field in the electromagnet 1. The magnetic field of the electromagnet 1 cancels the magnetic field of the permanent magnet 4 as a result of which, as shown in FIG. 3, the armature 7 is released and pulled by the elastic force of the release spring 13 so that the release lever 10 is turned clockwise to kick the second locking lever 36.

As shown in FIG. 5, the locking portion 36a of the second locking lever 36 is disengaged from the downwardly bent portion 33c of the intermediate lever 33 as the second locking lever 36 is turned counterclockwise. Accordingly, the intermediate lever 33 and the swing lever 37 are turned counterclockwise as a single unit instantly because the levers 33 and 37 are coupled through the coupling spring 34. As a result, the lens aperture lever 38 is moved upwardly thus starting the lens stopping-down operation. Further, as the intermediate 33 is retracted upon turning counterclockwise, the mirror operating lever 29 is turned counterclockwise by the elastic force of the mirror operating spring 17. The mirror lifting lever 26 is turned clockwise around the shaft 27 by the roller 29a pivotally mounted on the mirror operating lever 29 to turn the mirror holder 24 counterclockwise with the pin 28 to thereby move the mirror 23 from the viewfinder observing position to the photographing position. In the final stage of the rotation of the mirror operating lever 29, the upwardly bent portion 29c abuts against the one end portion 30a of the shutter start lever 30 to turn the start lever 30 clockwise. The start lever 30 thus turned kicks the shutter locking lever 32 to start the shutter top curtain.

The bottom curtain is released for a predetermined exposure time to execute the exposure operation. In the final stage of the run of the bottom curtain, the shutter bottom curtain lever 47 engages the upwardly bent portion 45c of the releasing lever 45 to turn the first locking lever 41 through the coupling lever 42 to thereby unlock the charge lever 18. As a result, the charge lever 18 is restored by the restoring spring 21. The engaging portion 18a of the charge lever 18 is engaged with the end portion 33a of the intermediate lever 33. Therefore, when the charge lever 18 is restored as described above, the swing lever 37 and the mirror operating lever 29 are also restored through the intermediate lever and therefore the lens stopping down operation is released and the mirror 23 is lowered. The second locking lever 36 is engaged with the downwardly bent portion 33c of the intermediate lever 33 by the spring 39. Furthermore, as the release spring 13 is disengaged from the charge lever 18, the force of energization provided by the release spring 13 is eliminated. Therefore, as the second locking lever 36 is restored by the force of the spring 39, the release lever 10 is also restored upon being turned counterclockwise. The armature 7 is attracted by the electromagnet 1 again while being guided by the elongated guide hole 59 of the base plate 5.

As is apparent from the above description of the preferred embodiment, according to the invention, a release lever is coupled to the armature of an electromagnet through which the field of a permanent magnet is impressed. A force of energization for moving the armature away from the electromagnet, i.e., a release force, is provided by a charge lever which is charged and held by the winding operation of the camera and is then restored upon completion of the photographing operation. This arrangement is free from the drawback that it is difficult to maintain a power balance in a mechanism which, as in the case of using the mirror operating member or the shutter running member, provides the force of energization from a small power providing member. Therefore, the arrangement of the invention has an advantage in that it provides a release force securely and positively. As generation of the release force is eliminated upon completion of the photographing operation, an extremely small amount of power is required to attract the armature again. Accordingly, the armature and the yoke which are typically made of a magnetic material such as permalloy, which is of low hardness, will not be damaged and it is unnecessary to provide a relief mechanism which counteracts against the possibility of overcharge which may be caused when the armature is attracted again. The electromagnetic release function is performed in accordance with the invention with a considerably simple construction as described with reference to a preferred embodiment of the invention.

What is claimed is:

1. An electromagnetic release device for a single lens reflex camera comprising: an armature; an electromagnet assembly including a permanent magnet, a yoke magnetically coupled to said permanent magnet and a coil would on said yoke, said armature being adapted to be attracted and retained by said electromagnet; a release lever coupled to be rotated by said armature, said release lever confronting a locking lever for locking upward movement of a mirror of said camera; a release spring elastically coupled to said release lever; a charge lever which is charged by a winding operation and locked upon completion of a winding operation, said charge lever abutting said release spring upon completion of said winding operation; said armature being released from said electromagnet assembly by exciting said coil of said electromagnet assembly with a electrical pulse, said release lever upon release of said armature abutting and kicking said locking lever, and said charge lever being restored by running of a bottom curtain of said camera which is effected when a photographing operation is ended whereupon the force of said release spring is eliminated.

2. The electromagnetic release device of claim 1 further comprising a coupling lever having one end coupled to said armature and an opposite end coupled by a pin to one end of said release lever.

3. The electromagnetic release device of claim 2 wherein said release lever is rotatably mounted upon a shaft and said release spring has a central portion thereof looped around said shaft, a first end portion hooked around said pin coupling said coupling lever to said release lever, and a second end disposed to abut against a portion of said charge lever in the position of said charge lever upon completion of a winding operation.

4. The electromagnetic release device of claim 3 further comprising a second spring resiliently urging said charge lever away from engagement with said release spring.

5. The electromagnetic release device of claim 4 wherein said charge lever is rotatably mounted upon a second shaft, and further comprising a mirror operating spring, said mirror operating spring being looped around said second shaft and having a first end abutting a downwardly bent portion of said charge lever and a second end engaged with a mirror operating lever.

6. The electromagnetic release device of claim 5 further comprising a second locking lever for locking said charge lever upon completion of a winding operation.

7. An electromagnetic release device for a single lens reflex camera comprising: an armature; an electromagnetic assembly including a permanent magnet, a yoke magnetically coupled to said permanent magnet, and a coil wound on said yoke, said electromagnetic assembly being fixedly mounted upon a mirror box of said camera; an armature adapted to be attracted to said yoke of said electromagnet assembly, said armature being slidably mounted on said mirror box; a release lever rotatably mounted upon a first shaft; a coupling lever, said coupling lever having one end coupled to said armature and a second end rotatably coupled by a first pin to a first end of said release lever; a release spring having a central portion looped around said first shaft, a first end hooked around said first pin, and a second end extending outwardly from said first shaft; a charge lever rotatably mounted on a second shaft; means for locking said charge lever upon completion of a winding operation; means for stopping upward movement of said release lever; a restoring spring looped around said second shaft and having a first end abutting against a downwardly bent portion of said charge lever and a second end engaged with a mirror operating lever; a restoring spring operatively coupled to urge said charge lever away from said release lever; means for charging said charge lever during a winding operation; a portion of said charge lever abutting said second end of said release spring upon completion of a winding operation to urge said armature away from said yoke of said electromagnet assembly, a second end of said release lever kicking said locking lever upon application of an electrical pulse to said coil to release said armature, said charge lever being restored by running of a bottom curtain of said camera which is effected when a photographing operation is ended whereupon the force of said release spring is eliminated.

* * * * *